United States Patent
Murata et al.

(10) Patent No.: US 8,349,454 B2
(45) Date of Patent: Jan. 8, 2013

(54) STRENGTHENED GLASS SUBSTRATE AND PROCESS FOR PRODUCING THE SAME

(75) Inventors: Takashi Murata, Otsu (JP); Hiroki Yamazaki, Otsu (JP)

(73) Assignee: Nippon Electric Glass Co., Ltd., Otsu-shi, Shiga (JP)

( * ) Notice: Subject to any disclaimer, the term of this patent is extended or adjusted under 35 U.S.C. 154(b) by 404 days.

(21) Appl. No.: 12/597,079

(22) PCT Filed: Jun. 3, 2008

(86) PCT No.: PCT/JP2008/060213
§ 371 (c)(1),
(2), (4) Date: Oct. 22, 2009

(87) PCT Pub. No.: WO2008/149858
PCT Pub. Date: Dec. 11, 2008

(65) Prior Publication Data
US 2010/0087307 A1    Apr. 8, 2010

(30) Foreign Application Priority Data
Jun. 7, 2007    (JP) .................... 2007-151136

(51) Int. Cl.
- *B32B 17/00* (2006.01)
- *B32B 17/06* (2006.01)
- *C03C 21/00* (2006.01)
- *C03C 3/083* (2006.01)
- *C03C 3/085* (2006.01)

(52) U.S. Cl. .............. 428/410; 501/68; 501/69; 501/70; 65/30.1; 65/30.13

(58) Field of Classification Search ............ 501/68, 501/69, 70; 428/410; 65/30.1, 30.13
See application file for complete search history.

(56) References Cited

U.S. PATENT DOCUMENTS

| | | | |
|---|---|---|---|
| 3,954,487 A * | 5/1976 | Gliemeroth et al. | 428/410 |
| 6,251,812 B1 * | 6/2001 | Koyama et al. | 501/69 |
| 6,383,404 B1 * | 5/2002 | Sakai et al. | 216/97 |
| 6,436,859 B1 * | 8/2002 | Muramoto et al. | 501/69 |
| 2005/0003136 A1 * | 1/2005 | Kurachi et al. | 428/65.3 |
| 2005/0215414 A1 * | 9/2005 | Kawai | 501/69 |

FOREIGN PATENT DOCUMENTS

| | | |
|---|---|---|
| JP | 4-6123 | 1/1992 |
| JP | 5-194130 | 8/1993 |
| JP | 11-191212 | 7/1999 |
| JP | 2000-7372 | 1/2000 |
| JP | 2000-132829 | 5/2000 |
| JP | 2000-268349 | 9/2000 |
| JP | 2000-272931 | 10/2000 |
| JP | 2000-348344 | 12/2000 |
| JP | 2002-3241 | 1/2002 |
| JP | 2003-36522 | 2/2003 |
| JP | 2006-83045 | 3/2006 |

OTHER PUBLICATIONS

Tetsuro Izumitani et al., "Atarashii Garasu To Sono Bussei (Novel Glass and Properties Thereof)", 1st Edition, Management System Laboratory Co., Ltd., Aug. 20, 1984, pp. 451-498.

* cited by examiner

*Primary Examiner* — Karl Group
*Assistant Examiner* — Elizabeth A Bolden
(74) *Attorney, Agent, or Firm* — Drinker Biddle & Reath LLP

(57) ABSTRACT

An object of the invention is to obtain a glass substrate having high mechanical strength by reconciling suitability for ion exchange and devitrification proof in a glass. The strengthened glass substrate of the invention is a strengthened glass substrate having a compression stress layer in the surface thereof, the glass substrate having a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45. The above-mentioned strengthened glass can be produced by melting raw glass materials mixed together so as to result in the given glass composition, forming the melt into a sheet by an overflow downdraw process, and then conducting an ion exchange treatment to form a compression stress layer in the glass sheet surface.

18 Claims, No Drawings

STRENGTHENED GLASS SUBSTRATE AND PROCESS FOR PRODUCING THE SAME

TECHNICAL FIELD

The present invention relates to a strengthened glass substrate. In particular, the invention relates to a strengthened glass substrate which has been chemically strengthened and is suitable for use as the cover glass of a portable telephone, digital camera, PDA (personal digital assistant), or solar cell or for use in touch panel displays.

BACKGROUND ART

Devices such as portable telephones, digital cameras, PDAs, or touch panels and solar cells tend to spread more and more.

In those applications, resins such as acrylics have hitherto been used as protective members for protecting the displays. However, since acrylic resins have a low Young's modulus, there have been cases where the acrylic resin substrate bends when the display is pushed with, e.g., a finger, and comes into contact with the display to cause a display failure. There also have been a problem that the acrylic resin substrate is apt to be marred and to thereby impair visibility. One measure in overcoming those problems is to use a glass substrate as a protective member. Glass substrates for use as a protective member for those devices are required to (1) have high mechanical strength, (2) have a high Young's modulus, (3) have a low density, (4) be inexpensive and capable of being supplied in large quantities, and (5) have excellent bubble quality. For satisfying the requirement (1), glass substrates strengthened by ion exchange or the like (so-called strengthened glass substrates) have hitherto been used (see patent document 1 and non-patent document 1).

Patent Document 1: JP-A-2006-83045

Non-Patent Document 1: Tetsuro Izumitani et al., Atarashii Garasu To Sono Bussei (Novel glass and properties thereof), 1st edition, Management System Laboratory Co., Ltd., Aug. 20, 1984, pp. 451-498

DISCLOSURE OF THE INVENTION

Problems that the Invention is to Solve

In non-patent document 1, there is a statement to the effect that as the $Al_2O_3$ content in a glass composition is increased, the suitability for ion exchange of the glass improves and the mechanical strength of glass substrates can be improved.

However, as the $Al_2O_3$ content in a glass composition is increased, the glass comes to have impaired devitrification proof, so that this glass is apt to devitrify during forming to impair glass substrate production efficiency, quality, etc. In addition, when a glass has poor devitrification proof, this glass is formable only by roll forming or the like and cannot give a sheet glass having high surface accuracy. Accordingly, a polishing step must be separately and additionally conducted after sheet glass formation. Polishing a glass substrate is apt to develop minute defects in the surface of the glass substrate, making it difficult to maintain the mechanical strength of the glass substrate.

Under such circumstances, it has been difficult to reconcile suitability for ion exchange and devitrification proof in a glass, and it has been difficult to greatly improve the mechanical strength of a glass substrate. In addition, the glass substrates for use in displays such as touch panel displays have been reduced in thickness year by year for the purpose of attaining weight reduction in devices. Since such thin glass substrates are apt to break, a technique for improving the mechanical strength of a glass substrate is becoming important more and more.

A technical subject for the invention therefore is to obtain a glass substrate having high mechanical strength by reconciling suitability for ion exchange and devitrification proof in a glass.

Means for Solving the Problems

The present inventors have made various investigations. As a result, it has been found that high suitability for ion exchange and high devitrification proof can be reconciled by heightening the content of $Al_2O_3$ and simultaneously incorporating at least one ingredient selected from the group consisting of MgO, $ZrO_2$, and ZnO, and further by properly determining the value of $(MgO+ZrO_2+ZnO)/(MgO+ZrO_2+ZnO+Al_2O_3)$ in terms of mass proportion. It has been further found that ion exchange is apt to be accelerated by limiting the content of SrO and BaO among alkaline earth ingredients. The invention has been proposed based on these findings.

That is, a strengthened glass substrate of the invention is a strengthened glass substrate having a compression stress layer in the surface thereof, the glass substrate having a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45. Herein, each "%" in the following explanations means "% by mass" unless otherwise indicated.

Secondly, the strengthened glass substrate of the invention may be a strengthened glass substrate having a compression stress layer in the surface thereof and having a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-5.5% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45.

Thirdly, the strengthened glass substrate of the invention may have been chemically strengthened.

Fourthly, the strengthened glass substrate of the invention may have a compressive stress of the surface thereof of 100 MPa or higher and a depth of the compression stress layer of 1 μm or larger. The "compressive stress of the surface" and the "depth of the compression stress layer" mean values calculated from the number of interference stripes observed in a sample examination with a surface stress meter (FSM-6000, manufactured by Toshiba Corp.) and from the distance between the stripes.

Fifthly, the strengthened glass substrate of the invention may have an unpolished surface. The term "unpolished surface" means that the main surfaces (the front side and the back side) of the glass have not been polished. In other words, that term means that the front side and the back side are fire-polished surfaces. The surfaces have an average surface roughness (Ra), as determined by the method in accordance with SEMI D7-97 "Method of Determining Surface Roughness of FPD Glass Substrates", of 10 Å or lower, preferably 5 Å or lower, more preferably 2 Å or lower. The edge face parts may have undergone a polishing treatment such as beveling.

Sixthly, the strengthened glass substrate of the invention may have a liquidus temperature of 1,050° C. or lower. The term "liquidus temperature" means a crystallization temperature determined by pulverizing the glass, preparing a glass powder which passes through a standard 30-mesh sieve (opening size, 500 μm) and remains on a 50-mesh sieve (opening size, 300 μm), placing the glass powder in a platinum boat, holding this boat in a temperature-gradient furnace for 24 hours, and then measuring the temperature at which crystallization has occurred.

Seventhly, the strengthened glass substrate of the invention may have a liquidus viscosity of $10^{4.0}$ dPa·s or higher. The term "liquidus viscosity" means the viscosity of the glass as measured at the liquidus temperature. The higher the liquidus viscosity is and the lower the liquidus temperature is, the more the glass is superior in devitrification proof and in formability into glass substrates.

Eighthly, the strengthened glass substrate of the invention may be used in a touch panel display.

Ninthly, the strengthened glass substrate of the invention may be used as a cover glass of a portable telephone.

Tenthly, the strengthened glass substrate of the invention may be used as a cover glass of a solar cell.

Eleventhly, the strengthened glass substrate of the invention may be used as a protective member in a display.

Twelfthly, a glass of the invention has a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45.

Thirteenthly, a process for producing a strengthened glass of the invention includes: melting raw glass materials mixed together so as to result in a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being in the range of from 0.25 to 0.45; forming the melt into a sheet; and then conducting an ion exchange treatment to form a compression stress layer in the glass surface.

Fourteenthly, according to the process for producing a strengthened glass of the invention, the melt may be formed into a sheet by a downdraw process.

Fifteenthly, according to the process for producing a strengthened glass of the invention, the melt may be formed into a sheet by an overflow downdraw process.

ADVANTAGES OF THE INVENTION

The strengthened glass substrate of the invention is produced from a glass having a high $Al_2O_3$ content and high suitability for ion exchange. Since the glass from which the glass substrate is to be produced has excellent devitrification proof, an overflow downdraw process or the like can be employed. Therefore, there is no need of conducting polishing after the forming, so that the glass substrate obtained is free from minute defects caused by polishing. The glass substrate hence has an effect that the mechanical strength thereof is high.

Furthermore, since the strengthened glass substrate can be produced without via a polishing step, a reduction in production cost can be attained and the glass substrate can be supplied at low cost.

Consequently, the strengthened glass substrate of the invention can be suitable for use in applications such as touch panel displays, the cover glasses of portable telephones, the cover glasses of solar cells, and protective members for displays. Incidentally, touch panel displays are mounted in portable telephones, digital cameras, PDAs, etc. The touch panels for use in mobile applications are strongly desired to have a smaller weight, smaller thickness, and higher strength, and there is a desire for a glass substrate which is thin and has high mechanical strength. In this respect, the strengthened glass substrate of the invention can be suitable for use in those applications because the glass substrate has practically sufficient mechanical strength even when reduced in thickness.

Furthermore, the glass of the invention has a high $Al_2O_3$ content and high suitability for ion exchange. In addition, the glass has excellent devitrification proof. This glass can hence be formed by an overflow downdraw process or the like.

Therefore, when the glass of the invention is used, a strengthened glass substrate having high mechanical strength can be produced at low cost.

In the process for producing a strengthened glass of the invention, since the glass having high suitability for ion exchange and excellent devitrification proof is used, a strengthened glass substrate having high mechanical strength can be produced at low cost.

BEST MODE FOR CARRYING OUT THE INVENTION

The strengthened glass substrate of the invention has a compression stress layer in the surface thereof. Methods for forming a compression stress layer in the surface of a glass substrate include a physical strengthening method and a chemical strengthening method. For the strengthened glass substrate of the invention, it is preferred to form a compression stress layer by a chemical strengthening method. The chemical strengthening method is a method in which alkali ions having a large ionic radius are diffused into the surface of a glass substrate by ion exchange at a temperature not higher than the strain point of the glass. So long as a compression stress layer is formed by the chemical strengthening method, the strengthening treatment can be satisfactorily conducted even when the glass substrate has a small thickness, whereby desired mechanical strength can be obtained. Moreover, even when the glass substrate in which a compression stress layer has been formed is cut, this glass substrate does not break readily unlike glass substrates strengthened by physical strengthening methods, such as the air-cooling tempering method.

Conditions for the ion exchange are not particularly limited, and may be determined while taking account of the viscosity characteristics of the glass, etc. In particular, when ion exchange is conducted between potassium ions in molten $KNO_3$ salt and lithium and sodium components in a glass substrate, then a compression stress layer can be efficiently formed in the surface of the glass substrate.

The reasons why the glass composition of the strengthened glass substrate of the invention has been restricted to the range shown above are explained below. Hereinafter, each "%" means "% by mass" unless otherwise indicated.

$SiO_2$ is a component which forms a glass network. The content thereof is 40-70%, preferably 50-70%, more preferably 55-65%, especially preferably 58-65%. In case where the content of $SiO_2$ is too high, this glass is difficult to melt and form or this glass has too low a coefficient of thermal expansion and is difficult to have the same coefficient of thermal expansion as peripheral materials. On the other hand, in case where the content of $SiO_2$ is too low, vitrification is difficult. In addition, such a glass has an increased coefficient of thermal expansion and tends to be reduced in thermal shock resistance.

$Al_2O_3$ is a component which enhances suitability for ion exchange. $Al_2O_3$ further has an effect of enhancing the heat resistance and Young's modulus of the glass. The content thereof is 12-25%. In case where the content of $Al_2O_3$ is too high, devitrified crystals are apt to separate out in the glass, making it difficult to form the glass by the overflow downdraw process or the like. In addition, such a glass has too low a coefficient of thermal expansion and is difficult to have the same coefficient of thermal expansion as peripheral materials. Moreover, such a glass has an increased viscosity at high temperatures and is difficult to melt. When the content of $Al_2O_3$ is too low, there is a possibility that the glass cannot have sufficient suitability for ion exchange. From those standpoints, the upper limit of a preferred $Al_2O_3$ content range is 20% or lower, preferably 19% or lower, more preferably 18% or lower, still more preferably 17% or lower, furthermore preferably 16.8% or lower, especially preferably 15% or lower.

$B_2O_3$ is a component which has an effect of lowering the liquidus temperature, high-temperature viscosity, and density of the glass and further has an effect of enhancing the suitability for ion exchange of the glass. The content thereof is 0-10%, preferably 0-6%, more preferably 0-5%, even more preferably 0-3%, most preferably 0-1%. On the other hand, in case where the content of $B_2O_3$ is too high, there is a possibility that ion exchange might leave stains on the surface or that the glass might have impaired water resistance or have a reduced liquidus viscosity.

$Li_2O$ is an ion-exchange component and simultaneously is a component which reduces the high-temperature viscosity of the glass to improve meltability and formability. Furthermore, $Li_2O$ is a component which has an effect of improving the Young's modulus of the glass and has an effect of reducing crack incidence. Moreover, $Li_2O$ is highly effective in enhancing the value of compressive stress among alkali metal oxides. The content of $Li_2O$ is 0-8%. However, the lower limit thereof may be 0.1% or higher, 0.5% or higher, especially 1% or higher, for the purpose of improving Young's modulus, reducing crack incidence, or heightening the value of compressive stress. From the standpoint of devitrification proof, the upper limit thereof may be set at 7% or lower, 6% or lower, 5% or lower, especially 4% or lower. In case where the content of $Li_2O$ is too high, such a glass has a reduced liquidus viscosity and is apt to devitrify. Furthermore, such a glass has too high a coefficient of thermal expansion and, hence, the glass has reduced thermal shock resistance or is difficult to have the same coefficient of thermal expansion as peripheral materials. In addition, there are cases where the glass has too low a low-temperature viscosity and is apt to undergo stress relaxation. In this case, the value of compressive stress may decrease rather than increase.

$Na_2O$ serves not only as an ion-exchange component but as a component having effects of reducing the high-temperature viscosity of the glass to improve meltability and formability and of reducing crack incidence. Furthermore, $Na_2O$ serves also as a component which improves the devitrification proof of the glass. The content of $Na_2O$ is 6-15%. The content thereof preferably is 6-13%, more preferably 6-12.6%, still more preferably 6-12%, especially preferably 6-10%. In case where the content of $Na_2O$ is too high, such a glass has too high a coefficient of thermal expansion. The glass hence has reduced thermal shock resistance or is difficult to have the same coefficient of thermal expansion as peripheral materials. In addition, the resultant glass composition has a poor balance, and the devitrification proof of the glass tends to be impaired rather than improved. On the other hand, in case where the content of $Na_2O$ is low, such a glass has impaired meltability, too low a coefficient of thermal expansion, or impaired suitability for ion exchange.

$K_2O$ has an effect of promoting ion exchange, and this compound among alkali metal oxides is highly effective in increasing the depth of the compression stress layer. Furthermore, $K_2O$ serves as a component having effects of reducing the high-temperature viscosity of the glass to improve meltability and formability and of reducing crack incidence. $K_2O$ serves also as a component which improves devitrification proof. The content of $K_2O$ is 0-10%. Especially for the purpose of designing the glass composition so as to result in a compression stress layer having a larger depth, it is preferred to regulate the lower limit of the content thereof to 0.1% or higher, more preferably 0.5% or higher, still more preferably 1% or higher, further more preferably 2% or higher, especially preferably 3% or higher. On the other hand, in case where the content of $K_2O$ is too high, such a glass has a high coefficient of thermal expansion, so that the glass has reduced thermal shock resistance or is difficult to have the same coefficient of thermal expansion as peripheral materials. In addition, the resultant glass composition has a poor balance, and the devitrification proof of the glass tends to be impaired rather than improved. It is therefore preferred to regulate the upper limit to 6% or lower, more preferably 5.5% or lower.

In case where the total content of alkali metal components $R_2O$ (R is one or more members selected from Li, Na, and K) is too high, such a glass not only is susceptible to devitrification but also has too high a coefficient of thermal expansion, so that the glass has reduced thermal shock resistance and is difficult to have the same coefficient of thermal expansion as peripheral materials. On the other hand, when the total content of alkali metal components $R_2O$ is too high, there are cases where the glass has too low a strain point and it is difficult to obtain a high value of compressive stress. There also are cases where the glass has a reduced viscosity around the liquidus temperature and it is difficult to ensure a high liquidus viscosity. Consequently, the total content of $R_2O$ is preferably regulated to 20% or lower, especially preferably 18% or lower. On the other hand, when the total content of $R_2O$ is too low, there are cases where the glass is poor in suitability for ion exchange and in meltability and has an increased crack incidence. Consequently, the total content of $R_2O$ is regulated to 13% or higher.

MgO, $ZrO_2$, and ZnO are components having an effect of greatly improving suitability for ion exchange. Furthermore, these are components having effects of reducing the high-temperature viscosity of the glass and of improving strain point or Young's modulus. The content of MgO is 0-3.9%, preferably 0-3%, more preferably 0-2%. When the content of MgO is too high, there are cases where the glass has impaired devitrification proof or is apt to undergo phase separation. The content of $ZrO_2$ is 0-6%, preferably 0-5.5%, more preferably 0-5%, even more preferably 0-3%. When the content of $ZrO_2$ is too high, there are cases where the glass has exceedingly poor devitrification proof. The content of ZnO is 0-5%, preferably 0-4%. When the content of ZnO is too high, there are cases where the glass has impaired devitrification proof or is apt to undergo phase separation. In the invention, at least one of these components is contained as an essential component from the standpoint of improving suitability for ion exchange.

It is preferable that the total content $MgO+ZrO_2+ZnO$ be 0.01-9%, especially preferably 0.5-7.7%. In case where the total content of these components is too high, such a glass tends to be too high in density or coefficient of thermal expansion or to have impaired devitrification proof. On the other hand, in case where the total content thereof is too low, it is difficult to obtain those effects.

In the invention, the mass proportion $(MgO+ZrO_2+ZnO)/(MgO+ZrO_2+ZnO+Al_2O_3)$ is strictly regulated, whereby a liquidus temperature which renders the overflow downdraw process possible and high suitability for ion exchange can be reconciled. The value of $(MgO+ZrO_2+ZnO)/(MgO+ZrO_2+ZnO+Al_2O_3)$ in terms of mass proportion is 0.25-0.45, preferably 0.25-0.4. By regulating the value of this ratio to 0.25 or larger, the suitability for ion exchange of the glass can be improved. On the other hand, in case where the value of that ratio exceeds 0.45, the resultant glass composition has a poor balance and the glass has impaired devitrification proof, making it impossible to employ the overflow downdraw process. In addition, the glass has too low a viscosity, making it difficult to maintain a high liquidus viscosity. In this case also, it is difficult to employ the overflow downdraw process.

An alkaline earth metal ingredient R'O other than MgO (R' is one or more members selected from Ca, Sr, and Ba) is an ingredient which can be added for various purposes. However, when an alkaline earth metal ingredient R'O is contained in a large amount, such a glass is high in density and coefficient of thermal expansion and has impaired devitrification proof. In addition, such a glass tends to have an increased crack incidence and impaired suitability for ion exchange. Consequently, the total content of alkaline earth metal ingredients R'O is preferably 0-9.9%, more preferably 0-8%, still more preferably 0-5%, especially preferably 0-3%.

CaO is a component which reduces the high-temperature viscosity of the glass to enhance meltability and formability and heightens the strain point and Young's modulus of the glass. The content thereof is 0-5%. However, in case where the content of CaO is high, such a glass is high in density, coefficient of thermal expansion, and crack incidence and is apt to devitrify. Furthermore, such a glass tends to have impaired suitability for ion exchange. Consequently, it is preferable that the content thereof be 4% or lower, more preferably 1% or lower, still more preferably 0.8% or lower, especially preferably 0.5% or lower. Ideally, it is desirable that the glass composition contain substantially no CaO. The term "contain substantially no CaO" herein means the case where the content of CaO in the glass composition is 0.2% or lower.

SrO and BaO are components which reduce the high-temperature viscosity of the glass to improve meltability and formability and heighten the strain point and Young's modulus of the glass. The content of each of them preferably is 0-2.9%. In case where the content of SrO or BaO is high, suitability for ion exchange tends to be impaired. In addition, such a glass is high in density, coefficient of thermal expansion, and crack incidence or is susceptible to devitrification. It is preferable that the content of SrO be 2% or lower, more preferably 1.5% or lower, still more preferably 1% or lower, furthermore preferably 0.5% or lower, especially preferably 0.2% or lower. On the other hand, the content of BaO is preferably 2.5% or lower, more preferably 2% or lower, still more preferably 1% or lower, furthermore preferably 0.8% or lower, still furthermore preferably 0.5% or lower, especially preferably 0.2% or lower.

In the invention, the total content SrO+BaO is regulated to 0-5%, whereby suitability for ion exchange can be more effectively improved. Namely, since SrO and BaO have the function of inhibiting ion exchange reactions as stated above, to contain these components in a large amount is disadvantageous for giving a strengthened glass having high mechanical strength. A preferred range of SrO+BaO is 0-3%, more preferably 0-2.5%, still more preferably 0-2%, furthermore preferably 0-1%, especially preferably 0-0.2%.

In case where the value obtained by dividing the total content of R'O by the total content of $R_2O$ is large, there is a tendency that crack incidence increases and the devitrification proof of the glass is impaired. It is therefore preferable that the value of $R'O/R_2O$ in terms of mass proportion be regulated to 0.5 or smaller, more preferably 0.4 or smaller, still more preferably 0.3 or smaller, especially preferably 0.1 or smaller.

In the strengthened glass substrate of the invention, the glass composition may be constituted only of the components described above. However, other ingredients can be added so long as the addition thereof does not considerably impair the properties of the glass.

For example, ingredients such as $TiO_2$ and $P_2O_5$ can be added.

$TiO_2$ is an ingredient which enhances the suitability for ion exchange of the glass. The content thereof may be 0-5%. However, high $TiO_2$ contents result in coloration of the glass or impaired devitrification proof. Consequently, the content thereof is preferably 5% or lower, more preferably 4% or lower, still more preferably 2% or lower, especially preferably 1% or lower.

$P_2O_5$ is an ingredient which enhances the suitability for ion exchange of the glass and is highly effective especially in increasing the depth of the compression stress layer. The content thereof may hence be 0-8%. However, high $P_2O_5$ contents cause phase separation in the glass or impair water resistance. Consequently, the content thereof is preferably 5% or lower, more preferably 4% or lower, especially preferably 3% or lower.

One or more members selected from the group consisting of $As_2O_3$, $Sb_2O_3$, $CeO_2$, $SnO_2$, F, Cl, and $SO_3$ may be incorporated as a fining agent in an amount of 0-3%. It should, however, be noted that the use of $As_2O_3$, $Sb_2O_3$, $SO_3$, and F, in particular, $As_2O_3$ and $Sb_2O_3$, must be minimized from the standpoint of concern for the environment, and the content of each ingredient should be regulated to below 0.1%. Consequently, preferred fining agents in the invention are $SnO_2$, $CeO_2$, and Cl, and the content $SnO_2+CeO_2+Cl$ may be 0.001-1%, preferably 0.01-0.5%, more preferably 0.05-0.4%.

Rare-earth oxides such as $Nb_2O_5$ and $La_2O_3$ are ingredients which heighten the Young's modulus of the glass. However, raw materials are expensive, and incorporation of such a rare-earth oxide in a large amount results in impaired devitrification proof. Consequently, the content of such rare-earth oxides is preferably regulated to 3% or lower, more preferably 2% or lower, still more preferably 1% or lower, furthermore preferably 0.5% or lower, especially preferably 0.1% or lower.

In the invention, transition metal elements such as Co and Ni which highly color the glass are undesirable because these elements lower the transmittance of the glass substrate. Especially when the glass substrate is for use in touch panel display applications, high contents of the transition metal elements impair the visibility of the touch panel display. Specifically, it is preferable that the amount of a raw material or cullet to be used be regulated so as to result in 0.5% or lower, more preferably 0.1% or lower, especially preferably 0.05% or lower.

A preferred range of the content of each component can be suitably selected to obtain preferred glass composition ranges. Of these glass composition ranges, more preferred examples are as follows.

(1) A glass having a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-5.5% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45.

(2) A glass having a glass composition which includes, in terms of % by mass, 50-70% of $SiO_2$, 12-20% of $Al_2O_3$, 0-6% of $B_2O_3$, 0-8% of $Li_2O$, 6-15% of $Na_2O$, 0-6% of $K_2O$, 13-20% of $Li_2O+Na_2O+K_2O$, 0-3.9% of MgO, 0-5% of CaO, 0-5% of ZnO, 0-5% of $ZrO_2$, and 0-3% of SrO+BaO, the value of $(MgO+ZrO_2+ZnO)/(MgO+ZrO_2+ZnO+Al_2O_3)$ in terms of mass proportion being from 0.25 to 0.45, and which substantially contains neither $As_2O_3$ nor $Sb_2O_3$.

(3) A glass having a glass composition including, in terms of % by mass, 50-70% of $SiO_2$, 12-19% of $Al_2O_3$, 0-5% of $B_2O_3$, 0-8% of $Li_2O$, 6-15% of $Na_2O$, 0.5-6% of $K_2O$, 13-20% of $Li_2O+Na_2O+K_2O$, 0-3.9% of MgO, 0-4% of CaO, 0-5% of ZnO, 0-5% of $ZrO_2$, 0-3% of SrO+BaO, 0 to less than 0.1% of $As_2O_3$ and 0 to less than 0.1% of $Sb_2O_3$, the value of $(MgO+ZrO_2+ZnO)/(MgO+ZrO_2+ZnO+Al_2O_3)$ in terms of mass proportion being from 0.25 to 0.45.

(4) A glass having a glass composition including, in terms of % by mass, 55-65% of $SiO_2$, 12-16.8% of $Al_2O_3$, 0-3% of $B_2O_3$, 1-7% of $Li_2O$, 6-12.6% of $Na_{20}$, 1-6% of $K_2O$, 13-20% of $Li_2O+Na_2O+K_2O$, 0-3.9% of MgO, 0-4% of CaO, 0-5% of ZnO, 0-6% of $ZrO_2$, 0-2% of SrO+BaO, 0 to less than 0.1% of $As_2O_3$ and 0 to less than 0.1% of $Sb_2O_3$, the value of $(MgO+ZrO_2+ZnO)/(MgO+ZrO_2+ZnO+Al_2O_3)$ in terms of mass proportion being from 0.25 to 0.4.

(5) A glass having a glass composition including, in terms of % by mass, 55-65% of $SiO_2$, 12-15% of $Al_2O_3$, 0-1% of $B_2O_3$, 1-7% of $Li_2O$, 6-10% of $Na_{20}$, 1-6% of $K_2O$, 13-18% of $Li_2O+Na_2O+K_2O$, 0-3.9% of MgO, 0-4% of CaO, 0-5% of ZnO, 0-5% of $ZrO_2$, 0-2% of SrO+BaO, 0-1% of $TiO_2$, O to less than 0.1% of $As_2O_3$ and 0 to less than 0.1% of $Sb_2O_3$, the value of $(MgO+ZrO_2+ZnO)/(MgO+ZrO_2+ZnO+Al_2O_3)$ in terms of mass proportion being from 0.25 to 0.4.

It is preferred that the strengthened glass substrate of the invention satisfy the following properties.

The strengthened glass substrate of the invention has the glass composition described above and has a compression stress layer in the glass surface. The compression stress layer has a compressive stress of preferably 100 MPa or higher, more preferably 300 MPa or higher, still more preferably 400 MPa or higher, furthermore preferably 500 MPa or higher, especially preferably 600 MPa or higher, most preferably 700 MPa or higher. As the compressive stress increases, the mechanical strength of the glass substrate increases. On the other hand, when a layer having an exceedingly high compressive stress is formed in the surface of a glass substrate, there is a possibility that the substrate surface might develop microcracks to lower rather than heighten the strength of the glass. Consequently, the compressive stress of the compression stress layer is preferably regulated to 2,000 MPa or lower. When a higher compressive stress is desired, this may be attained by increasing the content of $Al_2O_3$, MgO, ZnO, $ZrO_2$, or $Li_2O$ or by reducing the content of SrO or BaO. Alternatively, the desired property may be obtained by shortening the period of ion exchange or lowering the temperature of an ion-exchange solution.

The depth of the compression stress layer is preferably 1 μm or larger, more preferably 3 μm or larger, even more preferably 5 μm or larger, especially preferably 10 μm or larger, most preferably 15 μm or larger. The larger the depth of the compression stress layer is, the less the glass substrate is apt to break even when the glass substrate receives a deep scratch. On the other hand, it is preferred to regulate the depth of the compression stress layer to 500 μm or smaller because too large depth thereof result in difficulties in cutting the glass substrate. When the depth of the compression stress layer is to be increased, this may be attained by increasing the content of $K_2O$ or $P_2O_5$ or by reducing the content of SrO or BaO. Alternatively, the desired depth may be obtained by prolonging the period of ion exchange or heightening the temperature of an ion-exchange solution.

Incidentally, the terms "compressive stress of the surface" and "depth of the compression stress layer" mean values calculated from the number of interference stripes observed in a sample examination with a surface stress meter (FSM-6000, manufactured by Toshiba Corp.) and from the distance between the stripes.

It is preferred that the strengthened glass substrate of the invention have a sheet thickness of 1.5 mm or smaller, more preferably 0.7 mm or smaller, still more preferably 0.5 mm or smaller, especially preferably 0.3 mm or smaller. The smaller the thickness of the glass substrate is, the lighter the glass substrate can be made. The strengthened glass substrate of the invention has an advantage that the glass substrate is less apt to break even when thin. In the case where the glass is formed by the overflow downdraw process, it is advantageous because a reduction in glass thickness can be attained without conducting polishing or the like.

The strengthened glass substrate of the invention preferably has an unpolished surface. The unpolished surface has an average surface roughness (Ra) of 10 Å or lower, preferably 5 Å or lower, more preferably 2 Å or lower. Incidentally, the average surface roughness (Ra) of the surface may be determined by the method in accordance with SEMI D7-97 "Method of Determining Surface Roughness of FPD Glass Substrates". The theoretical strength of a glass essentially is exceedingly high. In many cases, however, breakage is reached even at a stress far lower than the theoretical strength. This is because minute defects called Griffith flaws generate in the surface of the glass substrate in a step after glass formation, e.g., a polishing step. Consequently, when the surface of a strengthened glass substrate is kept unpolished, the mechanical strength inherent in the glass substrate is less apt to be impaired and the glass substrate is less apt to break. Furthermore, in the case where the surface of a glass substrate is kept unpolished, the cost of glass substrate production can be reduced because the polishing step among glass substrate production steps can be omitted. In the strengthened glass substrate of the invention, when both sides of the glass substrate are wholly kept unpolished, this glass substrate is even less apt to break. In the strengthened glass substrate of the invention, any cut surface of the glass substrate may be subjected to beveling or the like in order to prevent the glass substrate from breaking from the cut surface. Incidentally, unpolished surfaces may be obtained by forming the glass by the overflow downdraw process.

It is preferred that the strengthened glass substrate of the invention be one in which the glass has a liquidus temperature of 1,050° C. or lower, more preferably 1,000° C. or lower, especially preferably 950° C. or lower. The term "liquidus temperature" means a crystallization temperature determined by pulverizing the glass, preparing a glass powder which passes through a standard 30-mesh sieve (opening size, 500 μm) and remains on a 50-mesh sieve (opening size, 300 μm), placing the glass powder in a platinum boat, holding this boat in a temperature-gradient furnace for 24 hours, and then measuring the temperature at which crystallization has occurred. When the liquidus temperature is to be lowered, this may be attained by increasing the content of $Na_2O$, $K_2O$, or $B_2O_3$ or by reducing the content of $Al_2O_3$, $Li_2O$, MgO, ZnO, or $ZrO_2$.

The strengthened glass substrate of the invention preferably is one in which the glass has a liquidus viscosity of preferably $10^{4.0}$ dPa·s or higher, more preferably $10^{4.3}$ dPa·s or higher, even more preferably $10^{4.5}$ dPa·s or higher, especially preferably $10^{5.0}$ dPa·s or higher, most preferably $10^{5.5}$ dPa·s or higher. The term "liquidus viscosity" means the viscosity of the glass as measured at the liquidus temperature. When the liquidus viscosity is to be increased, this may be attained by increasing the content of $Na_2O$ or $K_2O$ or by reducing the content of $Al_2O_3$, $Li_2O$, MgO, ZnO, or $ZrO_2$.

The higher the liquidus viscosity is and the lower the liquidus temperature is, the more the glass is superior in devitrification proof and in formability into glass substrates. So long as the glass has a liquidus temperature of 1,050° C. or lower and a liquidus viscosity of $10^{4.0}$ dPa·s or higher, this glass can be formed by the overflow downdraw process.

The strengthened glass substrate of the invention may be one in which the glass has a density of preferably 2.8 g/cm³ or lower, more preferably 2.7 g/cm³ or lower, even more preferably 2.6 g/cm³ or lower, most preferably 2.55 g/cm³ or lower. The lower the density of the glass is, the more the glass substrate can be reduced in weight. The term "density" means the value determined by the well known Archimedes method. When the density of the glass is to be reduced, this may be attained by increasing the content of $SiO_2$, $P_2O_5$, or $B_2O_3$ or by reducing the content of an alkali metal oxide, alkaline earth metal oxide, ZnO, $ZrO_2$, or $TiO_2$.

The strengthened glass substrate of the invention may be one in which the glass has a coefficient of thermal expansion as measured at 30-380° C. of preferably $70 \times 10^{-7}$–$95 \times 10^{-7}$/° C., more preferably $75 \times 10^{-7}$–$95 \times 10^{-7}$/° C., even more preferably $80 \times 10^{-7}$–$95 \times 10^{-7}$/° C., especially preferably $85 \times 10^{-7}$–$95 \times 10^{-7}$/° C. When the glass has a coefficient of thermal expansion regulated so as to be within that range, it is easy to regulate the glass so as to have the same coefficient of thermal expansion as members such as metals and organic adhesives and the members such as metals and organic adhesives can be prevented from separating off. The term "coefficient of thermal expansion" means the value determined by averaging coefficients of thermal expansion at 30-380° C. as measured with a dilatometer. When the coefficient of thermal expansion is to be heightened, this may be attained by increasing the content of an alkali metal oxide or alkaline earth metal oxide. Conversely, when the coefficient is to be lowered, this may be attained by reducing the content of an alkali metal oxide or alkaline earth metal oxide.

The strengthened glass substrate of the invention may be one in which the temperature of the glass corresponding to a high-temperature viscosity of $10^{2.5}$ dPa·s is preferably 1,600° C. or lower, more preferably 1,550° C. or lower, still more preferably 1,530° C. or lower, even more preferably 1,500° C. or lower. The lower the glass temperature corresponding to a high-temperature viscosity of $10^{2.5}$ dPa·s is, the lower the burden to be imposed on the glass production facilities including the melting furnace is and the more the glass substrate quality concerning bubbles can be improved. Namely, the lower the glass temperature corresponding to a high-temperature viscosity of $10^{2.5}$ dPa·s is, the lower the cost of glass substrate production is. Incidentally, the glass temperature corresponding to a high-temperature viscosity of $10^{2.5}$ dPa·s corresponds to the melting temperature of the glass. The lower the glass temperature corresponding to a high-temperature viscosity of $10^{2.5}$ dPa·s is, the lower the temperature at which the glass can be melted is. When the temperature corresponding to $10^{2.5}$ dPa·s is to be lowered, this may be attained by increasing the content of an alkali metal oxide, alkaline earth metal oxide, ZnO, $B_2O_3$, or $TiO_2$ or by reducing the content of $SiO_2$ or $Al_2O_3$. Herein, a temperature corresponding to a glass viscosity means the value measured by the platinum ball pulling-up method.

The strengthened glass substrate of the invention may be one in which the glass has a Young's modulus of preferably 70 GPa or higher, more preferably 71 GPa or higher, even more preferably 73 GPa or higher. The higher the Young's modulus of the glass is, the less the glass substrate bends. As a result, when the glass substrate is used in a device such as a touch panel display and the display is pushed with a pen or the like, then the liquid-crystal element or the like disposed inside the device is less apt to be pressed and a display failure is less apt to occur in this display. The term "Young's modulus" herein means the value determined by the resonance method. When the Young's modulus is to be heightened, this may be attained by increasing the content of $Al_2O_3$, $Li_2O$, ZnO, MgO, or $ZrO_2$ or by reducing the content of $B_2O_3$.

The strengthened glass substrate of the invention may be one in which the glass has a specific modulus of preferably 27 GPa/(g/cm³) or higher, more preferably 28 GPa/(g/cm³) or higher, even more preferably 29 GPa/(g/cm³) or higher, especially preferably 30 GPa/(g/cm³) or higher. The higher the specific modulus of the glass is, the more the glass substrate sagging caused by its weight is diminished. As a result, when glass substrates are placed in a cassette or the like in a production step, the substrates can be housed with a reduced clearance between the substrates, whereby the productivity can be improved.

The strengthened glass substrate of the invention may be one in which the glass has a crack incidence of preferably 70% or lower, more preferably 50% or lower, even more preferably 40% or lower, especially preferably 30% or lower, most preferably 20% or lower. The lower the crack incidence of the glass is, the less the glass substrate cracks. The term "crack incidence" herein means the value determined in the following manner. First, in a thermo-hygrostatic chamber kept at a humidity of 30% and a temperature of 25° C., a Vickers indenter set at a load of 500 g is pressed into a glass surface (optical polished surface) for 15 seconds and, at 15 seconds thereafter, the number of cracks generated from the four corners of the indentation is counted (the number of cracks per indentation is 4 at the most). The indenter is thus struck 20 times, and the total number of cracks generated is determined. Thereafter, the crack incidence is determined using the expression: {(total number of cracks generated)/80}×100. When the crack incidence is to be reduced, this may be attained by increasing the content of $Li_2O$ or $Al_2O_3$ or by reducing the content of CaO, SrO, BaO, or ZnO.

A glass of the invention has a glass composition including, in terms of % by mass, 40-70% of $SiO_2$, 12-25% of $Al_2O_3$, 0-10% of $B_2O_3$, 0-8% of $Li_2O$, 6-15% of $Na_2O$, 0-10% of $K_2O$, 13-20% of $Li_2O+Na_2O+K_2O$, 0-3.9% of MgO, 0-5% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45. In the glass of the invention, since the reasons why the glass composition has been restricted to the range shown above and the preferred ranges of the components are the same as in the strengthened glass substrate described above, explanations thereon are omitted here. The glass of the invention can, of course, combine the properties and effects of the strengthened glass substrate described above.

It is preferred that the glass of the invention, when subjected to 4-hour ion exchange in 430° C. molten $KNO_3$ salt, come to have a surface compressive stress of 300 MPa or higher and a depth of the compression stress layer of 3 μm or larger. Since the glass of the invention has a glass composition restricted to the range shown above, it has satisfactory suitability for ion exchange. This glass can hence be easily caused to have a surface compressive stress of 300 MPa or higher and a depth of compression stress layer of 3 μm or larger.

The glass according to the invention can be produced by charging raw glass materials which have been mixed so as to result in a composition within that composition range into a continuous melting furnace, heating the raw materials at 1,500-1,600° C. to melt these, fining the melt, subsequently feeding the molten glass to a forming apparatus and forming it into a sheet, and gradually cooling the sheet glass.

For the forming, it is preferred to employ the overflow downdraw process. When the overflow downdraw process is used for glass substrate formation, a glass substrate which in an unpolished state has satisfactory surface quality can be obtained. The reason for this is as follows. In the case of the overflow downdraw process, those parts of the molten glass which become the surfaces of a glass substrate do not come into contact with the trough refractory and are formed in the state of a free surface. Accordingly, a glass substrate which in an unpolished state has satisfactory surface quality can be formed. In this regard, the overflow downdraw process is a technique of glass substrate production in which a glass in a molten state is caused to overflow both sides of a refractory trough structure and the molten glass which has overflown is formed by drawing it downward while causing the flows of the molten glass to meet each other at the lower end of the trough structure. The structure and material of the trough structure are not particularly limited so long as a glass substrate having desired dimensions and desired surface accuracy can be obtained and qualities which render the glass substrate usable can be attained. Any method may be used for applying a force to the glass substrate in order to conduct forming by downward drawing. For example, a method may be employed in which refractory rolls having a sufficiently large width are rotated while being kept in contact with the glass substrate to thereby draw the glass. Alternatively, use may be made of a method in which pairs of refractory rolls are used for drawing so as to be in contact with only near-edge parts of the glass substrate. Since the glass of the invention has excellent devitrification proof and has viscosity characteristics suitable for forming, forming by the overflow downdraw process can be carried out highly accurately. Incidentally, so long as the glass has a liquidus temperature of 1,050° C. or lower and a liquidus viscosity of $10^{4.0}$ dPa·s or higher, a glass substrate can be produced therefrom by the overflow downdraw process.

Besides the overflow downdraw process, various processes can be employed. For example, various forming techniques can be employed such as downdraw processes (e.g., a slot-down process and a redraw process), float process, rolling-out process, and pressing process. When the glass is formed by, for example, the pressing process, small glass substrates can be efficiently produced.

For producing the strengthened glass substrate of the invention, the glass is prepared first. Subsequently, the glass is subjected to a strengthening treatment. Although glass substrate cutting into a given size may be conducted before the strengthening treatment, it is preferred to conduct the cutting after the strengthening treatment because this can reduce production cost. It is desirable that the strengthening treatment be an ion exchange treatment. The ion exchange treatment can be accomplished, for example, by immersing the glass sheet in a 400-550° C. solution of potassium nitrate for 1-8 hours. Optimal conditions for the ion exchange may be selected while taking account of the viscosity characteristics of the glass, etc.

EXAMPLES

The invention will be explained below based on Examples.
Tables 1 to 3 show Examples according to the invention (Samples Nos. 5 to 9) and Comparative Examples (Samples Nos. 1 to 4 and 10). In the tables, (MgZrZn)/(MgZrZnAl) means $(MgO+ZrO_2+ZnO)/(MgO+ZrO_2+ZnO+Al_2O_3)$.

TABLE 1

|  | No. 1 | No. 2 | No. 3 | No. 4 |
|---|---|---|---|---|
| $SiO_2$ | 71.9 | 70.5 | 70.8 | 70.2 |
| $Al_2O_3$ | 9.4 | 9.2 | 9.3 | 9.2 |
| ZnO |  | 3.9 |  | 2.6 |
| $Na_2O$ | 7.2 | 7.0 | 7.1 | 7.0 |
| $Li_2O$ | 1.7 | 1.7 | 1.7 | 1.7 |
| $K_2O$ | 5.4 | 5.3 | 5.4 | 5.3 |
| $Sb_2O_3$ | 0.5 | 0.5 | 0.5 | 0.5 |
| $ZrO_2$ |  |  |  |  |
| $TiO_2$ |  |  |  |  |
| $B_2O_3$ |  |  | 3.3 | 2.2 |
| MgO | 3.9 | 1.9 | 1.9 | 1.3 |
| BaO |  |  |  |  |
| $P_2O_5$ |  |  |  |  |
| Density (g/cm³) | 2.40 | 2.45 | 2.40 | 2.43 |
| Ps (° C.) | 478 | 474 | 474 | 473 |
| Ta (° C.) | 526 | 522 | 516 | 517 |
| Ts (° C.) | 771 | 764 | 729 | 737 |
| $10^4$ (° C.) | 1195 | 1181 | 1141 | 1154 |
| $10^3$ (° C.) | 1417 | 1403 | 1374 | 1386 |
| $10^{2.5}$ (° C.) | 1559 | 1549 | 1530 | 1538 |
| α (×$10^{-7}$/° C.) | 80 | 81 | 77 | 78 |
| Liquidus temperature (° C.) | <800 | <800 | <800 | <800 |
| Liquidus viscosity, $\log\eta TL$ (dPa·s) | >7.2 | >7.2 | >6.7 | >6.7 |
| Young's modulus (GPa) | 74 | 74 | 75 | 75 |
| Specific Young's modulus (GPa/(g/cm³)) | 30.8 | 30.2 | 31.3 | 30.8 |
| Crack incidence (%) | 13 | 5 | 20 | 8 |
| Compressive stress (MPa) | 570 | 590 | 560 | 570 |
| Depth of compression layer (μm) | 21 | 21 | 18 | 19 |

TABLE 2

|  | No. 5 | No. 6 | No. 7 | No. 8 |
|---|---|---|---|---|
| $SiO_2$ | 64.7 | 62.9 | 63.8 | 62.1 |
| $Al_2O_3$ | 13.7 | 13.6 | 13.7 | 13.6 |
| ZnO | 1.9 | 3.9 | 1.9 | 3.8 |
| $Na_2O$ | 8.4 | 8.3 | 8.4 | 8.3 |
| $Li_2O$ | 1.9 | 1.9 | 1.9 | 1.9 |
| $K_2O$ | 5.5 | 5.5 | 5.5 | 5.5 |
| $Sb_2O_3$ |  |  |  |  |
| $TiO_2$ |  |  | 0.9 | 0.9 |

TABLE 2-continued

|  | No. 5 | No. 6 | No. 7 | No. 8 |
| --- | --- | --- | --- | --- |
| MgO | 3.8 | 3.8 | 3.8 | 3.8 |
| $SnO_2$ | 0.1 | 0.1 | 0.1 | 0.1 |
| Density (g/cm$^3$) | 2.46 | 2.50 | 2.47 | 2.51 |
| Ps (° C.) | 493 | 495 | 496 | 498 |
| Ta (° C.) | 538 | 540 | 540 | 541 |
| Ts (° C.) | 768 | 762 | 761 | 755 |
| $10^4$ (° C.) | 1156 | 1138 | 1140 | 1127 |
| $10^3$ (° C.) | 1363 | 1338 | 1344 | 1325 |
| $10^{2.5}$ (° C.) | 1493 | 1466 | 1473 | 1451 |
| α (×$10^{-7}$/° C.) | 88 | 89 | 89 | 89 |
| Liquidus temperature (° C.) | 1008 | 1038 | 1009 | 1032 |
| Liquidus viscosity, log ηTL (dPa · s) | 5.0 | 4.7 | 4.9 | 4.6 |
| Young's modulus (GPa) | 77 | 77 | 77 | 78 |
| Specific Young's modulus (GPa/(g/cm$^3$) | 31.2 | 31.0 | 31.1 | 31.2 |
| Crack incidence (%) | unmeasured | unmeasured | unmeasured | unmeasured |
| Compressive stress (MPa) | 830 | 900 | 840 | 900 |
| Depth of compression layer (μm) | 17 | 15 | 17 | 15 |

TABLE 3

|  | No. 9 | No. 10 |
| --- | --- | --- |
| $SiO_2$ | 58.3 | 57.8 |
| $Al_2O_3$ | 16.8 | 13.3 |
| ZnO |  | 5.0 |
| $Na_2O$ | 12.6 | 8.1 |
| $Li_2O$ | 4.9 | 3.3 |
| $K_2O$ | 1.5 | 3.9 |
| $ZrO_2$ | 5.8 | 5.7 |
| $TiO_2$ |  | 0.9 |
| MgO |  | 1.9 |
| $SnO_2$ | 0.1 | 0.1 |
| (MgZrZn)/(MgZrZnAl) | 0.26 | 0.49 |
| Density (g/cm$^3$) | 2.53 | 2.61 |
| Ps (° C.) | 470 | 505 |
| Ta (° C.) | 510 | 547 |
| Ts (° C.) | 704 | 751 |
| $10^4$ (° C.) | 1040 | 1081 |
| $10^3$ (° C.) | 1218 | 1254 |
| $10^{2.5}$ (° C.) | 1334 | 1367 |
| α (×$10^{-7}$/° C.) | unmeasured | 88 |
| Liquidus temperature (° C.) | 855 | >1050 |
| Liquidus viscosity, log ηTL (dPa · s) | 5.6 | <4.2 |
| Young's modulus (GPa) | unmeasured | unmeasured |
| Specific Young's modulus (GPa/(g/cm$^3$) | unmeasured | unmeasured |
| Crack incidence (%) | unmeasured | unmeasured |
| Compressive stress (MPa) | 822 | 1220 |
| Depth of compression layer (μm) | 13 | 10 |

Each sample was produced in the following manner. First, raw glass materials were mixed together so as to result in the glass composition shown in Tables 1 to 3. The raw materials were melted by heating at 1,600° C. for 8 hours with a platinum pot. Thereafter, the molten glass was poured onto a carbon plate and formed into a sheet. The glass substrates thus obtained were evaluated for various properties.

Density was determined by the well known Archimedes method.

Strain point Ps and annealing point Ta were measured based on the method as provided for in ASTM C336.

Softening point Ts was measured based on the method as provided for in ASTM C338.

The temperatures of each glass corresponding to viscosities of $10^{4.0}$ dPa·s, $10^{3.0}$ dPa·s, and $10^{2.5}$ dPa·s were measured by the platinum ball pulling-up method.

The coefficient of thermal expansion α was determined by obtaining an average coefficient of thermal expansion at 30-380° C. with a dilatometer.

Liquidus temperature was determined by pulverizing the glass, preparing a glass powder which passed through a standard 30-mesh sieve (opening size, 500 μm) and remained on a 50-mesh sieve (opening size, 300 μm), placing the glass powder in a platinum boat, holding this boat in a temperature-gradient furnace for 24 hours, and then measuring the temperature at which crystallization had occurred.

The liquidus viscosity of each glass indicates the viscosity of the glass as measured at the liquidus temperature.

Young's modulus was determined by the resonance method.

Crack incidence was determined in the following manner. First, in a thermo-hygrostatic chamber kept at a humidity of 30% and a temperature of 25° C., a Vickers indenter set at a load of 500 g was pressed into a glass surface (optical polished surface) for 15 seconds and, at 15 seconds thereafter, the number of cracks generated from the four corners of the indentation was counted (the number of cracks per indentation is 4 at the most). The indenter was thus struck 20 times, and the total number of cracks generated was determined. Thereafter, the crack incidence was determined using the expression: {(total number of cracks generated)/80}×100.

As a result, the glass substrates obtained as Examples according to the invention were found to have a density of 2.53 g/cm$^3$ or lower, a coefficient of thermal expansion of 88×$10^{-7}$-89×$10^{-7}$/° C., and a Young's modulus of 77 GPa or higher. These glass substrates were suitable for use as materials for a strengthened glass. These glass substrates had a liquidus viscosity as high as $10^{4.6}$ dPa·s or above and were capable of being formed by the overflow downdraw process. In addition, these glasses had a temperature at $10^{2.5}$ dPa·s as low as 1,493° C. or below. It is hence thought that a large quantity of glass substrates can be supplied therefrom at low cost with high productivity. Although the samples of the Examples according to the invention have not been examined for crack incidence, these samples are thought to be satisfactory. Incidentally, an unstrengthened glass substrate and a strengthened glass substrate differ from each other in microscopic glass composition in a surface layer of each glass substrate, but these glass substrates as a whole have substantially no difference in glass composition. Consequently, there is substantially no difference in properties such as density, viscosity, and Young's modulus between the unstrengthened glass substrate and the strengthened glass substrate. With respect to crack incidence, there are cases where the unstrengthened glass substrate and the strengthened glass substrate differ in the property because crack incidence is influenced by the composition of the glass surface layer. However, since there is a tendency that the strengthened glass substrate has a lower crack incidence, crack incidence in the invention cannot be a factor which reduces strength.

Subsequently, both surfaces of each of the glass substrates, i.e., Samples Nos. 1 to 10, were subjected to optical polishing and then to an ion exchange treatment. The ion exchange was conducted by immersing each sample in 430° C. $KNO_3$ molten salt for 4 hours. The surfaces of each sample which had undergone the treatment were cleaned. Thereafter, the compressive stress of each surface and the depth of the compression stress layer therein were calculated from the number of interference stripes observed in an examination with a surface stress meter (FSM-6000, manufactured by Toshiba Corp.) and from the distance between the stripes.

As a result, the glass substrates Nos. 5 to 9, which were Examples according to the invention, each were found to have a compressive stress of 822 MPa or higher in the surface, and the depth of this layer was as large as 13 μm or more.

In the Examples given above, the glasses were melted, formed by pouring, and then subjected to optical polishing before being subjected to an ion exchange treatment, for the convenience of explanations of the invention. In the case of production on an industrial scale, it is desirable that a glass substrate be formed by the overflow downdraw process and this glass substrate in which both surfaces are in an unpolished state be subjected to an ion exchange treatment.

While the invention has been described in detail and with reference to specific embodiments thereof, it will be apparent to one skilled in the art that various changes and modifications can be made therein without departing from the spirit and scope thereof.

This application is based on a Japanese patent application No. 2007-151136 filed on Jun. 7, 2007, the entire contents thereof being herein incorporated by reference. All the references cited herein are incorporated as a whole.

Industrial Applicability

The strengthened glass substrate of the invention is suitable for use as the cover glass of a portable telephone, digital camera, PDA, or the like or as a glass substrate for a touch panel display or the like. Besides being used in these applications, the strengthened glass substrate of the invention can be expected to be used in applications where high mechanical strength is required, such as window glasses, substrates for magnetic disks, substrates for flat panel displays, cover glasses for solar cells, cover glasses for solid imaging devices, and tableware.

The invention claimed is:

1. A strengthened glass substrate having a compression stress layer in the surface thereof, said glass substrate having a glass composition comprising, in terms of % by mass, 40-70% of $SiO_2$, 12-25% of $Al_2O_3$, 0-10% of $B_2O_3$, 0 to less than 4% of $Li_2O$, 6-15% of $Na_2O$, 0-10% of $K_2O$, 13-20% of $Li_2O+Na_2O+K_2O$, 0-3.9% of MgO, 0-0.8% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45.

2. The strengthened glass substrate according to claim 1, which is a strengthened glass substrate having a compression stress layer in the surface thereof and having a glass composition comprising, in terms of % by mass, 40-70% of $SiO_2$, 12-25% of $Al_2O_3$, 0-10% of $B_2O_3$, 0 to less than 4% of $Li_2O$, 6-15% of $Na_2O$, 0-10% of $K_2O$, 13-20% of $Li_2O+Na_2O+K_2O$, 0-3.9% of MgO, 0-0.8% of CaO, 0-5% of ZnO, 0-5.5% of $ZrO_2$, and 0-5% of SrO+BaO, the value of $(MgO+ZrO_2+ZnO)/(MgO+ZrO_2+ZnO+Al_2O_3)$ in terms of mass proportion being from 0.25 to 0.45.

3. The strengthened glass substrate according to claim 1, which has been chemically strengthened.

4. The strengthened glass substrate according to claim 1, which has a compressive stress of the surface thereof of 100 MPa or higher and a depth of the compression stress layer of 1 μm or larger.

5. The strengthened glass substrate according to claim 1, which has an unpolished surface.

6. The strengthened glass substrate according to claim 1, which is composed of a glass having a liquidus temperature of 1,050° C. or lower.

7. The strengthened glass substrate according to claim 1, which is composed of a glass having a liquidus viscosity of $10^{4.0}$ dPa·s or higher.

8. A touch panel display comprising: a strengthened glass substrate according to claim 1.

9. A cover glass of a portable telephone comprising: a strengthened glass substrate according to claim 1.

10. A cover glass of a solar cell comprising: a strengthened glass substrate according to claim 1.

11. A protective member in a display comprising: a strengthened glass substrate according to claim 1.

12. The strengthened glass substrate according to claim 1 or 2, which is conducted to a cutting after a strengthening treatment.

13. The strengthened glass substrate according to claim 1 or 2, which is a strengthened glass substrate having a glass Composition comprising, in terms of % by mass, less than 0.1% of $As_2O_3$, less than 0.1% of $Sb_2O_3$, and 1% or lower of $TiO_2$.

14. The strengthened glass substrate according to claim 1 or 2, which is formed by an overflow downdraw process.

15. The strengthened glass substrate according to claim 1 or 2, wherein cut surfaces of the glass substrate are subjected to beveling.

16. A process for producing a strengthened glass substrate, which comprises: melting raw glass materials mixed together so as to result in a glass composition comprising, in terms of % by mass, 40-70% of $SiO_2$, 12-25% of $Al_2O_3$, 0-10% of $B_2O_3$, 0 to less than 4% of $Li_2O$, 6-15% of $Na_2O$, 0-10% of $K_2O$, 13-20% of $Li_2O+Na_2O+K_2O$, 0-3.9% of MgO, 0-0.8% of CaO, 0-5% of ZnO, 0-6% of $ZrO_2$, and 0-5% of SrO+BaO, the value of $(MgO+ZrO_2+ZnO)/(MgO+ZrO_2+ZnO+Al_2O_3)$ in terms of mass proportion being in the range of from 0.25 to 0.45; forming the melt into a sheet; and then conducting an ion exchange treatment to form a compression stress layer in the glass surface.

17. The process for producing a strengthened glass substrate according to claim 16, wherein the melt is formed into a sheet by a downdraw process.

18. The process for producing a strengthened glass substrate according to claim 16, wherein the melt is formed into a sheet by an overflow downdraw process.

* * * * *